United States Patent [19]

Takada

[11] Patent Number: 4,564,154
[45] Date of Patent: Jan. 14, 1986

[54] SAFETY BELT RETRACTOR

[76] Inventor: Juichiro Takada, 3-12-1 Shinmachi, Tokyo, Japan

[21] Appl. No.: 550,763

[22] Filed: Nov. 10, 1983

[30] Foreign Application Priority Data

Nov. 11, 1982 [JP] Japan ................. 57-196792

[51] Int. Cl.$^4$ ............................................ B65H 75/48
[52] U.S. Cl. ........................ 242/107.4 B; 242/107.4 A
[58] Field of Search ................. 242/107.4 A, 107.4 B, 242/107.6

[56] References Cited

U.S. PATENT DOCUMENTS

| 3,632,058 | 1/1972 | Stoffel | 242/107.4 B |
| 3,822,840 | 7/1974 | Stephenson | 242/107.4 B |
| 4,083,512 | 4/1978 | Rumpf | 242/107.4 A |
| 4,099,685 | 7/1978 | Paitula | 242/107.4 B |
| 4,190,213 | 2/1980 | Ueda | 242/107.4 A |
| 4,386,745 | 6/1983 | Patel et al. | 242/107.4 B |

Primary Examiner—Stuart S. Levy
Assistant Examiner—Katherine Jaekel
Attorney, Agent, or Firm—Brumbaugh, Graves, Donohue & Raymond

[57] ABSTRACT

A safety belt retractor comprises a takeup shaft rotatably journalled on a frame and normally biased to wind a safety belt therearound. The shaft carries a coaxial, fixed ratchet wheel, a coaxial, rotatable inertia member, and a clutch mechanism composed of a lock ring coaxially and rotatably mounted on the takeup shaft and normally spring-biased to rotate in a belt-winding direction, the lock ring having internal teeth and a cam slot. A clutch engagement mechanism engages the internal teeth of the lock ring to couple the lock ring with the takeup shaft when there is a difference between the speeds of rotation of the takeup shaft and the inertia member. A pawl is pivotably supported on the frame and includes a cam follower received in the cam slot in the lock ring. The pawl is pivotably movable into an operative position in which it engages the ratchet wheel in response to rotation of the lock ring in the belt-unwinding direction when the lock ring is coupled to the takeup shaft, and is also pivotably movable into an original position in response to rotation of the lock ring in the belt-winding direction when the lock ring is uncoupled from the takeup shaft. The cam slot includes an extension portion for allowing the lock ring to rotate in a belt-unwinding direction without moving the cam follower in a direction to disengage the pawl from the operative position.

3 Claims, 7 Drawing Figures

SAFETY BELT RETRACTOR

BACKGROUND OF THE INVENTION

The present invention relates to a safety belt retractor. A previously known safety belt retractor comprises a takeup shaft, an inertia member mounted on the takeoff shaft for rotation relative thereto, and a clutch mechanism for bringing a pawl into engagement with a ratchet wheel affixed to the takeup shaft, thereby to prevent the takeup shaft from rotating when it and the inertia member are rotated relative to each other due to a difference between the speeds of rotation thereof. The known retractor operates effectively in its main function of stopping the belt from unwinding from the reel in a collision but occasionally malfunctions when the belt is undone from a buckle and is rewound on the takeup shaft for storage. The malfunction results in the inability to pull the belt from the retractor, a problem known as an "end lock."

The end lock in this retractor is caused by the unusual concurrence of several events, namely (1) inertial rotation of the inertia member after the takeup shaft has ceased its spring-loaded rotation upon completion of the belt winding, (2) actuation of the clutch mechanism due to such inertial rotation, (3) rotation of the takeup shaft in an opposite direction, that is, a belt-unwinding direction, due to reaction or rebound thereof, and (4) rotation of the inertia member in an opposite direction which is occasioned by the reverse rotation of the takeup shaft. When these events all occur, the clutch mechanism causes the pawl to engage the ratchet wheel, and keeps the pawl and the ratchet wheel in the engaging condition. Under such condition, the takeup shaft is prevented from rotating in the direction to allow the belt to unwind, so the belt, therefore, cannot be pulled out.

The safety belt retractor of the conventional design is also occasionally bothersome to the user, because when the vehicle incorporating the safety belt retractor is subjected to sudden shocks, the pawl can engage the ratchet wheel and prevent the safety belt from being pulled out, for example, when the user tries to lean forward.

SUMMARY OF THE INVENTION

Accordingly, it is an object of the present invention to provide a safety belt retractor which will operate reliably, particularly through the prevention of an end lock at the time the belt is stored and the prevention of an accidental lock due to unusual external forces applied to it, such as sudden shocks.

The above object is achieved by providing a cam slot such that a lock ring in a clutch mechanism which operates to bring a pawl into and out of engagement with a ratchet wheel can be rotated while the pawl and the ratchet wheel engage each other, and the pawl will be prevented from being accidentally moved.

According to the present invention, a safety belt retractor comprises a takeup shaft rotatably journalled on a frame and normally biased to wind a safety belt therearound, a ratchet wheel coaxially and fixedly mounted on the takeup shaft, an inertia member coaxially and rotatably mounted on the takeup shaft, and a clutch mechanism composed of a lock ring coaxially and relatively rotatably mounted on the takeup shaft and normally spring-biased to rotate in a belt-winding direction, the lock ring having internal teeth and a cam slot, and a clutch engagement mechanism for engaging the internal teeth of the lock ring to couple the lock ring with the takeup shaft when there is a difference between the speeds of rotation of the takeup shaft and the inertia member. A pawl pivotably supported on the frame has a cam follower that is received in the cam slot in the lock ring, the pawl being pivotably movable into an operative position in which it engages the ratchet wheel in response to rotation of the lock ring in the belt-unwinding direction when the lock ring is coupled to the takeup shaft and also pivotably movable into an original or normal position in response to rotation of the lock ring in the belt-winding direction when the lock ring is uncoupled from the takeup shaft.

The present invention is characterized, in particular, in that the cam slot includes an extension portion for allowing the lock ring to rotate in a belt-unwinding direction without moving the cam follower in a direction to move the pawl out of the operative position. The extension of the cam slot allows the lock ring to rotate in the belt-unwinding direction due to operation of the clutch in response to inertial rotation of the inertia member while the pawl is held in engagement with the ratchet wheel. Rotation of the lock ring allows the clutch engagement mechanism to move out of engagement with the internal teeth of the lock ring, whereupon the lock ring can rotate back in the belt-winding direction under the biasing force of a clutch spring in the mechanism. At this time, the lock ring moves the cam follower to disengage the pawl from the ratchet wheel, thus freeing the takeup shaft for subsequent rotation in the unwinding direction so the belt can be unreeled freely.

The present invention is preferably further characterized in that the cam slot has an end portion, remote from the extension portion thereof, having an arcuately curved cam surface in the vicinity of the position assumed by the cam follower when the pawl is in the original or normal position disengaged from the ratchet wheel. The curved end portion of the cam slot limits the movement of the cam follower from the original position in the cam slot to prevent the cam follower from being moved due to shocks. The above and other objects, features and advantages of the present invention will become more apparent from the following additional description taken in conjunction with the accompanying drawings, in which a preferred embodiment of the present invention is shown by way of illustrative example.

DESCRIPTION OF THE EMBODIMENT

Figure 1:
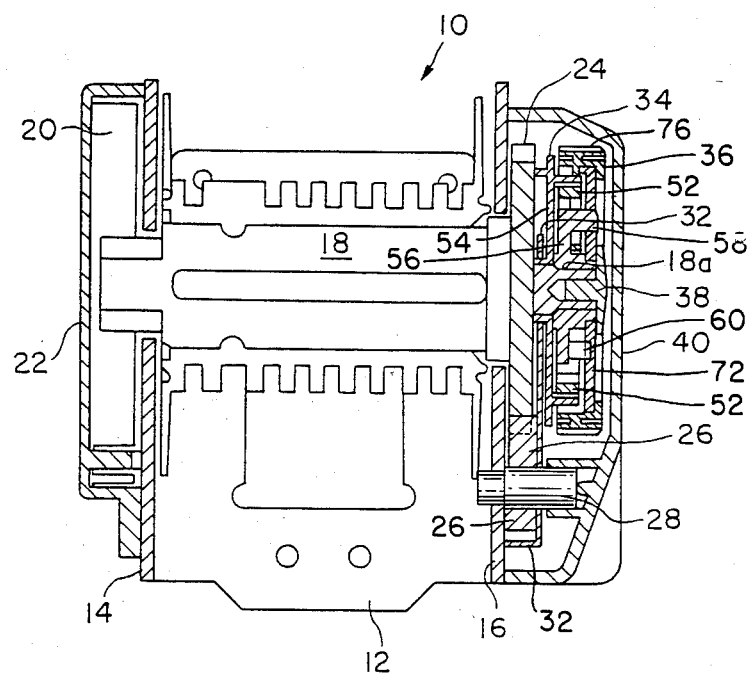
FIG. 1 is an axial cross-sectional view of a safety belt retractor according to the present invention.

The embodiment of a safety belt retractor 10 according to the present invention shown in the drawings has a channel-shaped frame 12 and a pair of spaced sidewalls 14, 16 which rotatably support a takeup shaft 18. A coiled leaf spring 20 is connected to one end of the takeup shaft 18 outwardly of the sidewall 14 and normally urges the takeup shaft 18 to rotate in a direction to wind a safety belt (not shown) thereon. The leaf spring 20 is covered by a cover 22 fixed to the sidewall 14.

Figure 2:
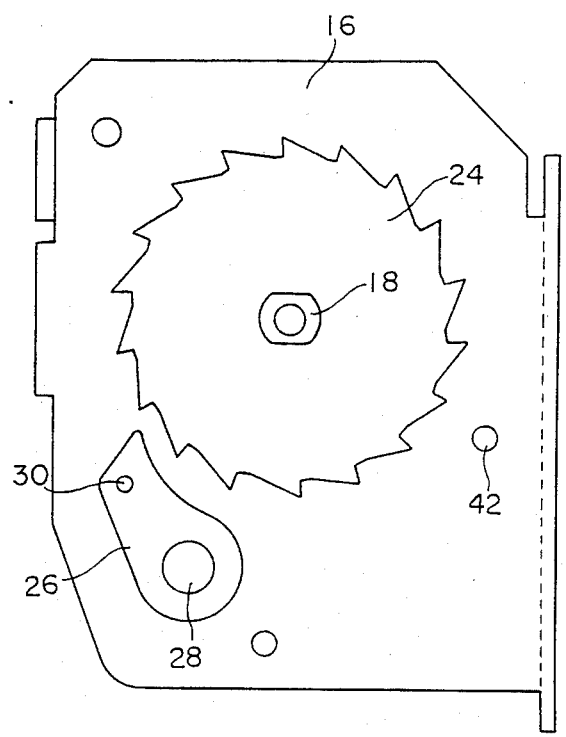
FIG. 2 is a plan view of the ratchet wheel fixed to a takeup shaft and the pawl engageable with the ratchet wheel.

To the other end of the takeup shaft 18, there is coaxially affixed a ratchet wheel 24 immediately adjacent to the sidewall 16. As most clearly shown in FIG. 2, a pawl 26 is pivotably mounted by a pin 28 on the sidewall 26 and is engageable with the ratchet wheel 24. The pawl 26 has a cam follower 30 (described in greater detail below).

On the takeup shaft 18, there are mounted a tie plate 32 for interconnecting an extension 18a of the takeup shaft 18 and the pin 28 and supporting the pin 28 in cooperation with the sidewall 16, a lock ring 34 disposed outwardly of the tie plate 32 and coaxially with and relatively to the takeup shaft 18, and an inertia member 36, those components being positioned successively in the order named outwardly from the ratchet wheel 24. A cap 38 is attached to an outermost end of the takeup shaft 18. The ratchet wheel 24, the cap 38, and other elements interposed therebetween are covered by a cover 40 fixed to the sidewall 16 by a projection (not shown) of the cover 40 force-fitted in a hole 42 (FIG. 2) defined in the sidewall 16.

Figure 3:
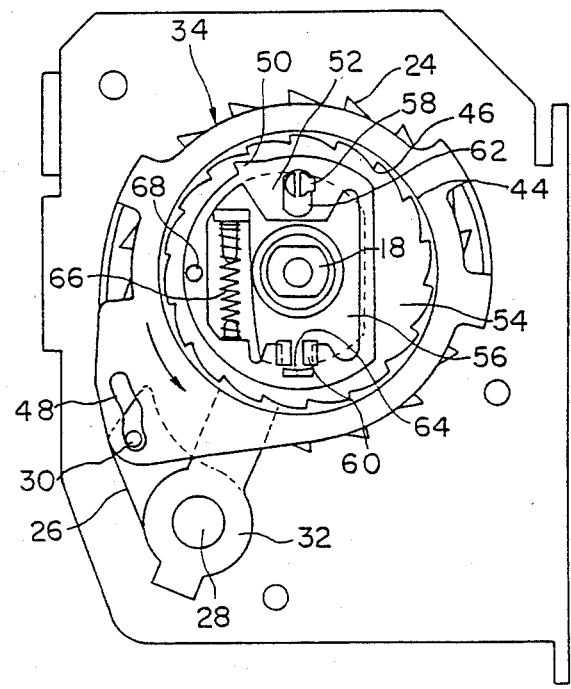
FIG. 3 is a plan view of the clutch mechanism.

The lock ring 34, which is substantially ring-shaped as a whole, includes a circular flange portion 44 extending axially outwardly and having internal teeth 46 (FIGS. 1 and 3). The number of the internal teeth 46 is equal to the number of teeth on the ratchet wheel 24, and the teeth 46 are normally radially aligned, respectively, with the teeth on the ratchet wheel 24. The lock ring 34 also has an inverted generally S-shaped cam slot 48 formed in an outer arm portion thereof. The cam follower 30 of the pawl 26 is received in the cam slot 48. The cam follower 30 resides at the radially outermost end of the cam slot 48 (the position shown in FIG. 3) when the pawl 26 is in the original or normal position in which the pawl 26 is out of meshing engagement with the ratchet wheel 24. The cam follower 30 is thus positioned since the lock ring 34 is urged by a spring (not shown) to rotate clockwise, which is the direction in which the safety belt winds onto the takeup shaft, to the clockwise stop position established by the cam slot 48 and cam follower 30.

An integral tooth 50 on a carrier 52 is engageable with the internal teeth 46 of the lock ring 34 and is radially movably supported on a retainer 56 fixed to the takeup shaft 18 outwardly of a disk-shaped portion 54 of the lock ring 34. On the retainer 56, there are mounted a first guide pin 58 and a pair of second guide pins 60 which are diametrically spaced apart from each other across the takeup shaft 18, the guide pins 58, 60 being loosely received, respectively, in a slot 62 and a recess 64 defined in the carrier 52. A coil spring 66 acts as a return spring between the retainer 56 and the carrier 52. The coil spring 66 normally maintains the tooth 50 in the normal disengaged position shown in FIG. 3 in which the tooth 50 is held out of engagement with the internal teeth 46 of the lock ring 34.

Figure 4:
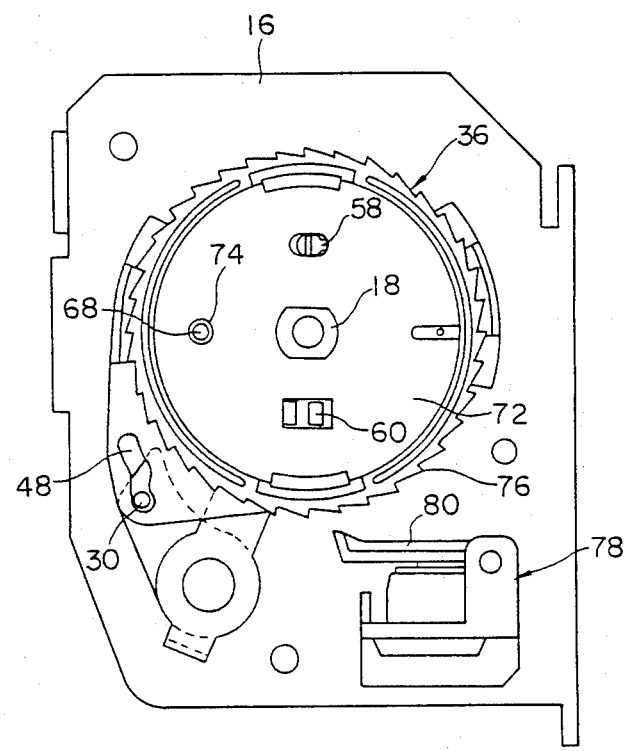
FIG. 4 is a plan view of the inertia member coupled to the clutch mechanism and the vehicle inertia sensor engageable with the inertia member.

The carrier 52 has a pin 68 received in an aperture 74 defined in a disk-shaped portion 72 of the inertia member 36, as illustrated in FIG. 4. The inertia member 36 includes a ring 76 at its perimeter having external teeth and positioned around the disk-shaped portion 72 and rotatable through a small arc relative thereto against the urging of a wire spring (not shown) that absorbs shock forces between the pawl 80 and the inertia member 36. A vehicle inertia sensing device 78 is mounted on the sidewall 16 and has a movable pawl 80 engageable with the external teeth of the ring 76.

The lock ring 34 having the internal teeth 46 and the cam slot 48 and the carrier 52 having the tooth 50 and the pin 68 jointly constitute a clutch mechanism which operates as follows: when there is a difference between the rates of rotation of the takeup shaft 18 and the inertia member 36 that results in rotation of the inertia member 36 relative to the takeup shaft in the belt-winding direction (clockwise in FIGS. 2 to 4), a force is imposed by the inertia member acting through the hole 74 and pin 68 on the carrier 52 that causes the carrier 52 to be moved against the force of the spring 66 to bring the tooth 50 into mesh with one of the internal teeth 46 on the lock ring 34. Because the carrier 52 is coupled by the guide pins 58 and 60 and the guide slots 62 and 64 to the retainer 56, which is affixed for rotation with the shaft, the next increment of rotation of the takeup shaft in the belt-unwinding direction rotates the lock ring 34 in the belt-unwinding direction, that is, in the counterclockwise direction of the arrow (FIG. 3). At this time, the cam follower 30 is forced to move along the cam surface of the cam slot 48, thereby causing the pawl 26 to engage the teeth of the ratchet wheel 24. Therefore, the ratchet wheel 24 is prevented from rotating about its own axis, and hence the takeup shaft 18 is also prevented from rotating in the belt-unwinding direction, that is, in the counterclockwise direction of the arrow (FIG. 3).

The operation of the clutch mechanism, as just described, ordinarily occurs only when the inertia member 36 is prevented from rotating in the belt-unwinding direction at the same angular rate as the takeup shaft 18, due either to its inertia in the event of a rapid acceleration of the rotation of the takeup shaft caused by rapid pullout of the safety belt or to engagement of the pawl 80 of the inertia sensing device 78 with the inertia member 36 in response to an abrupt change in the velocity of the vehicle, events associated with a collision of the vehicle. When there is no speed difference between the takeup shaft 18 and the inertia member 36, the tooth 50 is disengaged from the internal teeth 46 since the carrier 52 resides in the position of FIG. 3 under the resiliency of the coil spring 66. This allows the lock ring 34 to be kept by the spring force in the original or normal position in which the cam follower 30 occupies the original position shown in FIGS. 3 and 4 with the pawl 26 disengaged from the ratchet wheel 24, thus freeing the ratchet wheel 24 and the takeup shaft 18 coupled thereto for rotation.

When a speed difference occurs between the spring-biased rotation of the takeup shaft 18 in the belt-winding direction and inertial rotation of the inertia member 36 upon belt rewinding to the storage position, an end lock can occasionally occur due to operation of the clutch mechanism by inertial over-running of the inertia member 36 after the takeup shaft 18 stops followed by reverse rotation of the takeup shaft 18 in the belt-unwinding direction due to reaction or rebound. To prevent such an end lock, the lock ring 34, in accordance with the invention, is permitted to rotate due to the continued inertial rotation of the inertia member 36 after the pawl 26 has engaged the ratchet wheel 24 to lock the latter, thus releasing the tooth 50 from the internal teeth 46 to allow the lock ring 34 to return fully to the normal unlocked position under the force of the locking spring.

Figure 5:
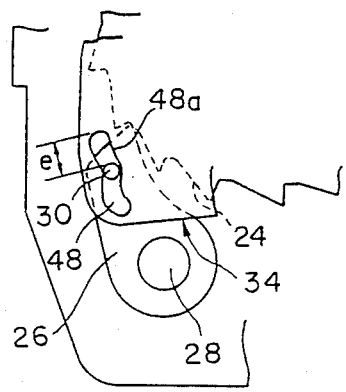
FIGS. 5 and 6 are fragmentary plan views of a cam slot defined in a lock ring and a cam follower mounted on a pawl with the pawl in an operative position.
Figure 6:
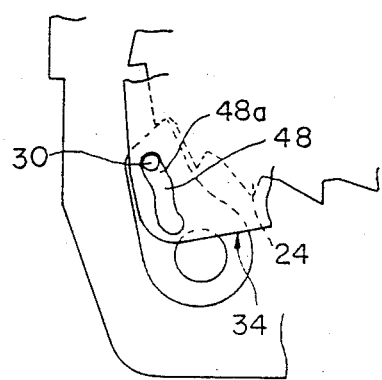

As shown in FIG. 5, the cam slot 48 has an extension portion 48a having a length "e" such that the cam follower 30 is positioned intermediate between the ends of the cam slot 48 when the pawl 26 engages the ratchet wheel 24. The cam slot extension portion 48a permits the lock ring 34 to rotate counterclockwise in the belt-unwinding direction until the end of the extension portion 48a is engaged by the cam follower 30, as shown in FIG. 6, without moving the cam follower 30 and hence keeping the pawl 26 in engagement with the ratchet wheel 24. The extension portion is arcuate in shape and has a center of curvature substantially coincident with the axis of the takeup shaft 18. When the inertia member 36 is held at rest to disengage the tooth 50 from the internal teeth 46, the lock ring 34 is released and rotated clockwise under the spring force, whereupon the pawl 26 is moved from an operative position in which it engages the ratchet wheel 24 to an inoperative position in which it disengages from the ratchet wheel 24. As a result, the end lock is prevented, and the belt can be pulled out at any time after it has been stored.

Figure 7:
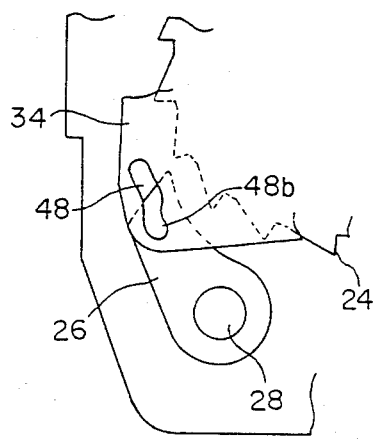
FIG. 7 is a fragmentary plan view of the cam slot with the cam follower omitted from the illustration.

As illustrated in FIG. 7, the cam slot 48 has a curved portion 48b having an angularly curved cam surface and in which the cam follower 30 is positioned as shown in FIGS. 3 and 4 when the pawl 26 is in the original position. The curved portion 48b has an arcuate shape extending around the center of rotation of the lock ring 34 and a dimension measured along the curvature substantially equal to the diameter of the cam follower 30 received therein. The curved portion 48b does not prevent the lock ring 34 from rotating counterclockwise in the belt-unwinding direction, but is effective enough to prevent the cam follower 30 from moving in the cam slot 48, under a shock that the vehicle is subjected to, into engagement with the ratchet wheel 24 in the event of a small amount of rotation of the lock ring 34 caused by the shock.

With the arrangement of the present invention, the takeup shaft will not be prevented from rotation by an end lock or an accidental lock, and hence can reliably be operated for more durable operation of the safety belt retractor.

Although a certain preferred embodiment has been shown and described, it should be understood that many changes and modifications may be made therein without departing from the scope of the appended claims.

I claim:

1. A safety belt retractor having a frame; a takeup shaft rotatably journalled on the frame and normally biased to wind a safety belt therearound; a ratchet wheel coaxially affixed to the shaft; an inertia member coaxially mounted on the takeup shaft for rotation relative therto; a clutch mechanism composed of a lock ring coaxially and rotatably mounted on the takeup shaft, the lock ring having internal teeth and a cam slot, and engagement means for engaging at least one of the internal teeth of the lock ring to couple the lock ring with the takeup shaft for rotation therewith when there is a difference between the speeds of rotation of the takeup shaft and the said inertia member; and a pawl pivotably supported on said frame and having a cam follower affixed thereon and received in the cam slot in the lock ring; the pawl being pivotably movable into an operative position in which it engages the ratchet wheel in response to rotation of the lock ring in the belt-unwinding direction when the lock ring is coupled to the takeup shaft, and also pivotably movable into an inoperative position out of engagement with the ratchet wheel in response to rotation of the lock ring in the belt-winding direction when the lock ring is uncoupled from the takeup shaft, characterized in that the engagement means includes a retainer affixed on the shaft, a carrier having at least one tooth engageable with an internal tooth of the lock ring, means coupling the retainer to the carrier for rotation therewith and for movement in a direction substantially diametrically relative to the shaft between a first position in which the carrier tooth is out of engagement with any lock ring tooth and a second position in which the carrier tooth engages a lock ring tooth, thereby to couple the retainer to the lock ring for rotation in the belt-unwinding direction, the carrier also being movable transversely to said diametrical direction relative to the retainer, a pin coupling the carrier to the inertia member at a location spaced apart radially from the shaft and substantially 90° from the said diametrical direction along which the carrier is movable relative to the retainer, and an inertia spring engaged between the retainer and carrier biasing the carrier toward the first position; and further characterized in that the cam slot includes an extension portion for allowing the lock ring to rotate in the belt-unwinding direction without moving the cam follower in a direction to disengage the pawl from the ratchet wheel when the pawl is in the operative position.

2. A safety belt retractor according to claim 1 and further characterized in that the extension portion of the cam slot is arcuate in shape and has a center of curvature substantially coincident with the axis of the takeup shaft.

3. A safety belt retractor according to claim 1 and further characterized in that the cam slot has a curved portion in which the cam follower is positioned when the pawl is held out of engagement with the ratchet wheel.

* * * * *

UNITED STATES PATENT AND TRADEMARK OFFICE
Certificate

Patent No. 4,564,154                      Patented: January 14, 1986

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Koutaro Kitai.

Signed and Sealed this Twenty-Sixth Day of October, 1999.

DONALD P. WALSH
*Supervisory Patent Examiner*
Art Unit 3653

REEXAMINATION CERTIFICATE (4675th)
United States Patent
Takada

(10) Number: US 4,564,154 C1
(45) Certificate Issued: Dec. 3, 2002

(54) SAFETY BELT RETRACTOR

(75) Inventor: Juichiro Takada, Tokyo (JP)

(73) Assignee: Takata Corporation, Tokyo (JP)

Reexamination Request:
No. 90/006,252, Mar. 21, 2002

Reexamination Certificate for:
| | |
|---|---|
| Patent No.: | 4,564,154 |
| Issued: | Jan. 14, 1986 |
| Appl. No.: | 06/550,763 |
| Filed: | Nov. 10, 1983 |

Certificate of Correction issued Oct. 26, 1999.

(30) Foreign Application Priority Data

Nov. 11, 1982 (JP) ............................................ 57-196792

(51) Int. Cl.⁷ .............................................. B65H 75/48
(52) U.S. Cl. .................................. 242/383.4; 242/384.5
(58) Field of Search ............................ 242/383.4, 384.5

(56) References Cited

U.S. PATENT DOCUMENTS

| | | |
|---|---|---|
| 3,632,056 A | 1/1972 | Hibbard et al. |
| 4,190,213 A | 2/1980 | Ueda |
| 4,386,745 A | 6/1983 | Patel et al. |

OTHER PUBLICATIONS

Rothbart, Mechanical Design and Systems Handbook, 2d. Ed., ©1964, 1985, McGraw–Hill, New York, NY, pp. 19.1–19.21 (Tab N).

*Primary Examiner*—Michael R Mansen

(57) ABSTRACT

A safety belt retractor comprises a takeup shaft rotatably journalled on a frame and normally biased to wind a safety belt therearound. The shaft carries a coaxial, fixed ratchet wheel, a coaxial, rotatable inertia member, and a clutch mechanism composed of a lock ring coaxially and rotatably mounted on the takeup shaft and normally spring-biased to rotate in a belt-winding direction, the lock ring having internal teeth and a cam slot. A clutch engagement mechanism engages the internal teeth of the lock ring to couple the lock ring with the takeup shaft when there is a difference between the speeds of rotation of the takeup shaft and the inertia member. A pawl is pivotably supported on the frame and includes a cam follower received in the cam slot in the lock ring. The pawl is pivotably movable into an operative position in which it engages the ratchet wheel in response to rotation of the lock ring in the belt-unwinding direction when the lock ring is coupled to the takeup shaft, and is also pivotably movable into an original position in response to rotation of the lock ring in the belt-winding direction when the lock ring is uncoupled from the takeup shaft. The cam slot includes an extension portion for allowing the lock ring to rotate in a belt-unwinding direction without moving the cam follower in a direction to disengage the pawl from the operative position.

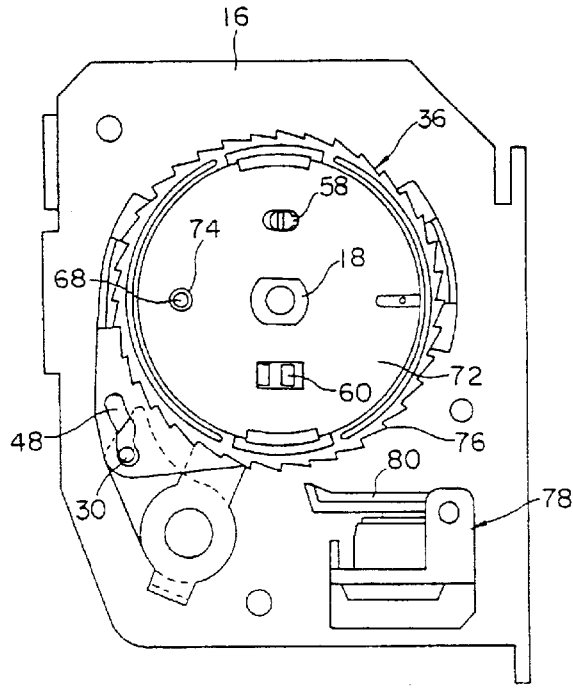

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

\* \* \* \* \*